(12) United States Patent
Geist et al.

(10) Patent No.: US 9,836,740 B1
(45) Date of Patent: Dec. 5, 2017

(54) METHOD AND APPARATUS FOR DYNAMICALLY CHANGED IDENTIFIERS IN AN RFID TAG DEVICE

(71) Applicants: Wyatt Drake Geist, Davie, FL (US); Jaime Andres Borras, Pembroke Pines, FL (US)

(72) Inventors: Wyatt Drake Geist, Davie, FL (US); Jaime Andres Borras, Pembroke Pines, FL (US)

(73) Assignee: Geotoll, Inc., Plantation, FL (US)

( * ) Notice: Subject to any disclaimer, the term of this patent is extended or adjusted under 35 U.S.C. 154(b) by 965 days.

(21) Appl. No.: 13/946,529

(22) Filed: Jul. 19, 2013

(51) Int. Cl.
*G06K 19/06* (2006.01)
*G06Q 20/38* (2012.01)
*G06K 7/10* (2006.01)
*G06Q 20/32* (2012.01)
*G07B 15/06* (2011.01)

(52) U.S. Cl.
CPC ..... *G06Q 20/3821* (2013.01); *G06K 7/10366* (2013.01); *G06Q 20/3278* (2013.01); *G07B 15/063* (2013.01)

(58) Field of Classification Search
CPC .... G06Q 10/08; G06Q 10/087; G06Q 20/341; G06Q 20/203; G06Q 20/20; G06K 2017/0045
USPC .............................. 235/492; 340/572.1–572.9
See application file for complete search history.

(56) References Cited

U.S. PATENT DOCUMENTS

| | | | |
|---|---|---|---|
| 8,810,402 B2* | 8/2014 | Smith | G08B 13/2417 340/539.13 |
| 2006/0273883 A1* | 12/2006 | Pillai | G06K 7/0008 340/10.42 |

* cited by examiner

*Primary Examiner* — Jamara Franklin
(74) *Attorney, Agent, or Firm* — The Concept Law Group, P.A.; Scott M. Garrett

(57) ABSTRACT

A method and apparatus for an RFID tag device that uses dynamic identifiers for transactions rather than a fixed identifier. An associated device communicates with the RFID tag device and obtains dynamic identifiers for transactions and provides the dynamic identifiers to the RFID tag device. The RFID tag device is protocol-agile and can be configured to operate using different protocols to complete transactions.

8 Claims, 5 Drawing Sheets

US 9,836,740 B1

METHOD AND APPARATUS FOR DYNAMICALLY CHANGED IDENTIFIERS IN AN RFID TAG DEVICE

FIELD OF THE DISCLOSURE

The present disclosure relates generally to wireless transactions using a radio frequency identifier (RFID) tag device, and more particularly to preventing the unauthorized use of an identifier of the RFID tag device.

BACKGROUND

RFID tag devices are used to store information, such as an identifier, that can be read at a distance by a reader. The reader transmits a radio signal, and upon receiving the signal, the RFID tag device (assuming it is within range) responds by transmitting data to the reader, typically using energy collected from the reader's signal. RFID tag devices are used in numerous applications, and can be passive or active, referring to how the RFID tag device is powered. A passive RFID tag device is powered by the reader signal; the passive RFID tag device collects energy from the reader signal and uses the collected energy to power the circuitry and transmit data to the reader. An active RFID tag device contains a battery and does not need to collect energy from the reader. Some RFID tag devices can be semi-passive or semi-active, being a hybrid of active and passive configurations. An RFID tag device can be stuck on, or otherwise mounted on something to associate the identifier in the RFID tag device with that thing.

One field where RFID technology is presently used, and gaining in popularity, is for conducting transactions (i.e. financial transactions). An RFID tag device identifier can be associated with an account, and money transferred from the account to an authorized recipient upon reading information from the RFID tag device in an authorized manner. One popular use of RFID technology for transactions is in vehicular tolls. A vehicle operator purchases a toll tag that includes an RFID tag device, having an identifier in the RFID tag device. The identifier is associated with a toll account for a toll authority. The vehicle operator places the toll tag in a vehicle, and upon passing through a toll gateway where the RFID tag device information is read, a toll fee is debited from the account associated with the toll tag.

However, if an RFID tag device is stolen, it could be used without the owner's permission to conduct unauthorized transactions. This could continue until the owner's account is depleted or the owner realizes the RFID tag device is missing and terminates the account associated with the RFID tag device. Accordingly, there is a need for a method and apparatus to prevent the unauthorized use of an RFID tag device in performing transactions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
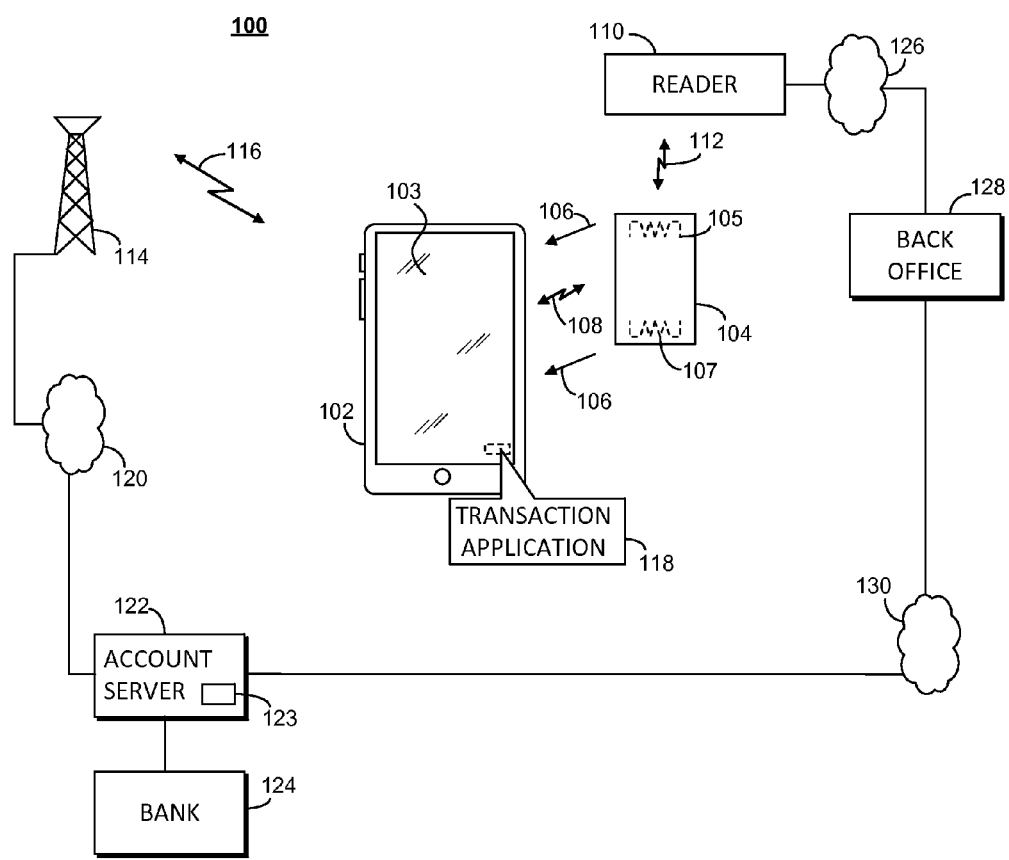
FIG. 1 is a system diagram of a mobile device and RFID tag device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The embodiments taught and described herein include a radio frequency identification (RFID) tag device that provides a dynamic identifier, and includes an RFID interface including a radio transceiver that transmits, using a selected protocol, an identifier in response to receiving a read signal. The RFID tag device further includes a dynamic identification (ID) controller coupled to the RFID interface that provides a dynamic identifier and an indication of the selected protocol to the RFID interface, wherein the dynamic identifier is used for only a signal transaction. The RFID tag device also includes an associated device interface coupled to the dynamic ID controller over which the dynamic ID controller receives the identifier and the indication of the selected protocol from an associated device.

FIG. 1 is a RFID transaction system 100 including a mobile device 102 and RFID tag device 104 in accordance with some embodiments. The mobile device 102 is a small, portable computing device that includes one or more radio transceivers. Examples of mobile devices include, for example, cellular or "smart" phones, tablet computing devices, personal digital assistants, and so on. In addition to radio interface(s), a mobile device 102 includes a graphical display 103 and input means to allow a user of the mobile device 102 to interact with, such as a touch screen or other input means, to control operation of the mobile device 102. The mobile device 102 further includes memory and a processor to execute program code for applications, programs, operating systems, and other software elements. The types of memory include read only memory (ROM) and random access memory (RAM), and can include other types of memory such as flash memory, and can include memory expansion such as memory card slots.

The RFID tag device 104 contains identity information that can be used for conducting wireless transactions. The identity information can include a dynamic identifier. A dynamic identifier is an identifier generated outside of the RFID tag device 104 that is then provided to the RFID tag device 104 in anticipation of a transaction. During the transaction the dynamic identifier is exchanged by the RFID tag device 104 with another device. Once a transaction is completed, the dynamic identifier can be erased from the RFID tag device, either directly or by powering off volatile memory in the RFID tag device 104 where the dynamic identifier was stored in the RFID tag device 104.

The RFID tag device 104 is a RF interface that includes an antenna and transceiver that operate according to a defined protocol or air interface. A transceiver includes means for both transmitting and receiving radio signals, such as a modulator and a demodulator, as well as amplification and filtering circuitry, as needed. An air interface defines channel format, timing, modulation, and other aspects of a protocol. The RFID interface 105 is used to communicate with another device, such as an RFID reader 110, over radio link 112. The RFID tag device 104 can be held against, or substantially close to the mobile device 102, such as by forming the RFID tag device 104 in the form of a card with an adhesive layer to affix the RFID tag device 104 onto a surface (such as a back surface) of the mobile device 102 as indicated by arrows 106.

The RFID tag device 104 also includes an associated device interface 107 to communicate with the mobile device 102. The associated interface 107 can be a wireless radio interface using a radio link 108, or it can be a wired interface using, for example, a universal serial bus (USB) or equivalent. In some embodiments the mobile device 102 and RFID tag device 104 communicate via radio link 108 using a near field communication (NFC) protocol, such as that specified by ISO/IEC 18000-3 which has an effective range of about 10 cm and operates at 13.56 MHz. Typically the NFC communication between the mobile device 102 and the RFID tag device 104 will be encrypted for security purposes.

In addition to exchanging data over the radio link 108, the mobile device 102 can power the RFID tag device 104. The power can be provided via a cable connected between the mobile device 102 and the RFID tag device 104, or via radio link 108. The energy of the NFC signal from the mobile device 102 can be collected in the RFID tag device and used to by the RFID tag device 104 to respond to the mobile device 102 over link 108, as well as for RFID operations via radio link 112.

Radio link 112 between the RFID tag device and RFID reader 110 can operate according to a known RFID interface protocol, such as, for example, that specified by ISO/IEC 18000-6c, ISO/IEC 18000-6b, or other known RFID interface standards. In some embodiments, the link 112 can be specifically configured to operate according to a vehicular toll standard for use in wireless tollway systems. In such embodiments, the RFID reader 110 can be a tollway reader that is positioned over a traffic lane of a toll road. The RFID reader 110 includes an antenna and transceiver to support communications with RFID tag devices, as is known. As the RFID tag device 104 passes by the reader 110, a signal from the reader 110 causes the RFID tag device 104 to respond via link 112 with identification information to identify the RFID tag device 104, and including the dynamic identifier. Furthermore, the reader 110 can, in some embodiments, transmit transaction information to the RFID tag device 104 via link 112. The transaction information can include information such as an identification of the reader 110, location, a toll amount, the time, and so on. In some embodiments the reader 110 does not transmit transaction information to the RFID tag device 104, and the RFID tag device 104 only indicates to the mobile device 102 that it has been read (i.e. that it has responded to a reader signal).

The mobile device 102 contains a transaction application 118 that allows the mobile device 102 to facilitate transactions, including processing transaction information received from the RFID tag device 104 or transaction information generated by the mobile device 102 upon receipt of an indication of a transaction by the RFID tag device 104, and forwarding the transaction information to an account server 122. Furthermore, the transaction application obtains a dynamic identifier to be used for a given transaction. In obtaining the dynamic identifier, the mobile device 102 can either request an identifier from an account server 122, or it can generate an identifier locally in the mobile device 102. Once the dynamic identifier is obtained, the mobile device 102 provides or transmits the dynamic identifier to the RFID tag device via the associated device interface 107. The mobile device 102, and specifically the transaction application 118, obtains a new identifier for each transaction (or a limited number of transactions).

In some embodiments the mobile device 102 initializes the RFID tag device 104 via link 108 before the RFID tag device interacts with the RFID reader 110 via link 112. For example, in a vehicular toll embodiment, the mobile device 102 can determine that the mobile device 102 is approaching a known toll gateway location using location information and road map data that indicates the location of toll gateways or gantries. When the mobile device 102 determines that it is within a selected distance of a toll gateway it can obtain a dynamic identifier to be used in the anticipated transaction, and then energize or power up the RFID tag device and provide the dynamic identifier to the RFID tag device 104 while maintaining power to the RFID tag device 104. The dynamic identifier is stored in a volatile memory of the RFID tag device 104 so that when power is removed from the RFID tag device 104, the dynamic identifier is lost. The NFC link 108 can be used to power the RFID tag device 104. Alternatively the mobile device 102 can provide power over a cable connected between the mobile device 102 and the RFID tag device 104, as in the case of a USB connection.

Using the tollway example of a wireless transaction, as the mobile device 102 and RFID tag device 104 pass through the toll gateway, the toll transaction occurs over link 112, which involves the RFID tag device 104 transmitting the dynamic identifier to the reader 110 over link 112 in response to a read signal from the reader 110. Subsequently, the RFID tag device 104 can transmit transaction information to the mobile device 102 via link 108, or an indication that the transaction occurred (i.e. the RFID tag device was read). Any transaction information received at the mobile device 102 from the RFID tag device 104 can be processed by the transaction application 118, which can store the transaction information, including the dynamic identifier used for the transaction. Furthermore, the transaction application 118 can display the transaction information upon receipt of the transaction information, or at a later time upon user request. Once the RFID tag device 104 completes transmitting to the mobile device 102 subsequent to the transaction, the mobile device 102 can shut off the NFC link 108, or otherwise remove power from the RFID tag device 104, to conserve battery life of the mobile device 102, resulting in the dynamic identifier being lost from the RFID tag device 104.

In some embodiments the mobile device 102, in addition to the radio interface to support radio link 108, comprises another radio interface to communicate at farther distances, such as a cellular transceiver for communicating over a cellular radio telephony link 116 with a cellular telephony infrastructure network 114. The cellular radio telephony link 116 is operated in accordance with a cellular data communications standard, such as, for example, the Long Term Evolution (LTE) standard, the Global System for Mobile Communications (GSM) Enhanced Data rates for GSM Evolution (EDGE), or code division multiple access (CDMA), among other known standards. The mobile device 102 can transmit requests and transaction information over the cellular telephony radio link 116, through a wide area network 120, such as the Internet, to the account server 122 that maintains account information for an account 123 associated with the RFID tag device 104. The account server 122 can be an entity that produces the dynamic identifiers used for various transactions upon determining that the transaction can be supported or is otherwise authorized, and can be linked to one or more banks 124 to maintain funding for transactions applied to the account 123 associated with the RFID tag device 104. As used here, the account server 122 can be abstraction representing a collection of servers that perform a variety of operations and services.

The account server 122 can further communicate with a back office server 128 that is associated with reader 110 over similar, if not the same, networks 126, 130. The back office server 128 logs transaction information and reconciles payment of funds due with the account server 122, matching the dynamic identifiers used for each transaction for a given account. Processing the transaction information is typically performed by batch processing, although in some embodiments it is contemplated that processing can be performed on a per-transaction or per-occurrence basis. The account server 122 can verify transactions based on transaction information received from the mobile device 102. The mobile device, in some embodiments, can use other radio interfaces such as, for example, a wireless local area network (WLAN) interface, such as that described in the Institute of Electrical and Electronic Engineers (IEEE) standard 802.11, and often referred to as "WiFi." In some embodiments the mobile device 102 can use the near field communication interface 108 to communicate with another device besides the RFID tag device 104, which can include a networked device that can forward transaction information from the mobile device 102 to the account server 122 or a plurality of other servers.

Figure 2:
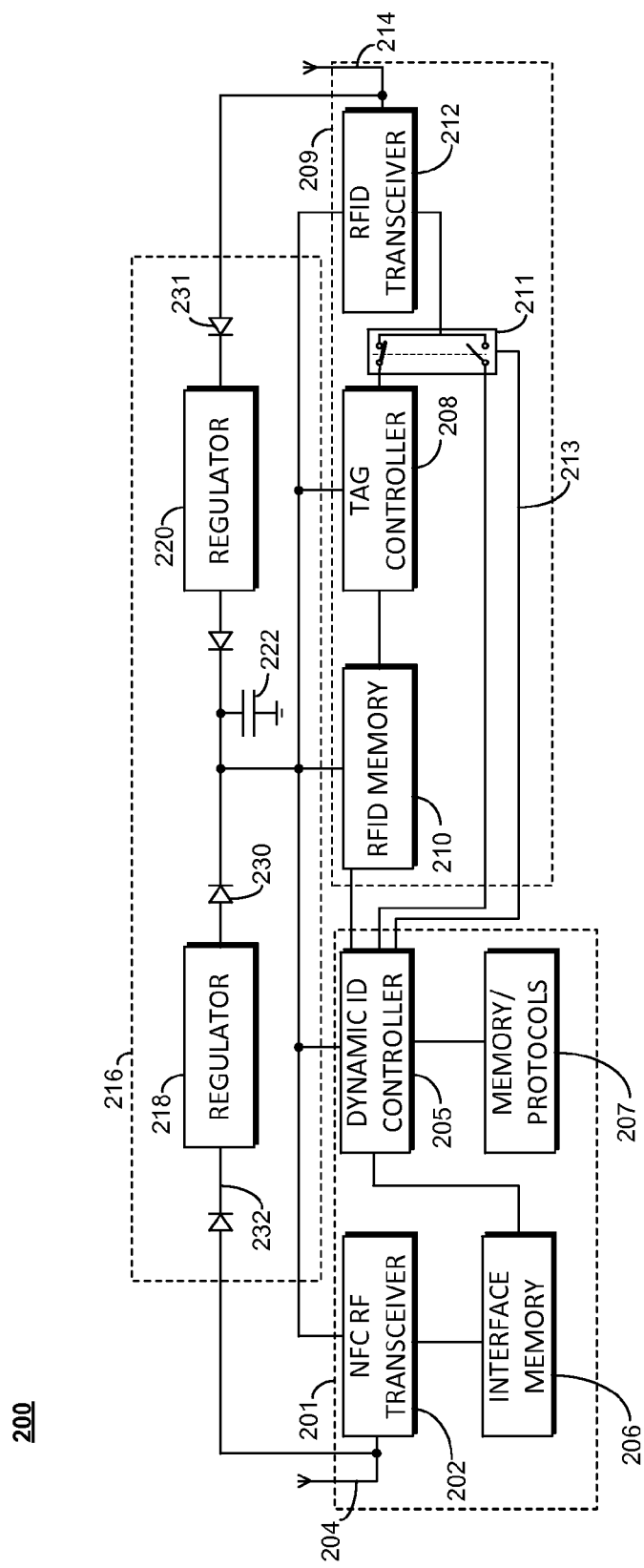
FIG. 2 is a schematic diagram of a RFID tag device in accordance with some embodiments.

FIG. 2 is a schematic diagram of a RFID tag device 200 in accordance with some embodiments. In particular the RFID tag device 200 communicates with an associated device, such as a mobile device, using a wireless radio interface as the associated device interface 201 of the RFID tag device 200. The RFID tag device 200 can be substantially similar to the RFID tag device 104 shown in FIG. 1. Generally, in the present exemplary embodiment, the RFID tag device 200 includes circuitry to realize two different RF interfaces, and can include a memory associated with each interface, a controller for operating the RFID tag device, and an energy collection circuit to collect energy from the RF interfaces to power the RFID tag device 200. Accordingly, the RFID tag device 200 includes a first RF interface that is an associated device interface 201, that can be, for example, a NFC RF interface. The associated device interface 201 includes an antenna 204 and a first transceiver 202 that communicates according to a first RF protocol, such as an NFC protocol. The associated device interface 201 can further include an interface memory 206 coupled to the first transceiver 202, and can be used to store data received over the associated device interface 201, or data that is to be transmitted over the associated device interface 201, or both. The interface memory 206 is a volatile memory, which means information only persists in it as long as power is applied to it. When power is removed from the interface memory, the information stored in it is lost. The associated device interface can further include a dynamic ID controller 205 that is coupled to the interface memory 206, and a protocol memory 207 that is a non-volatile memory for storing communication protocols or protocol stacks.

The RFID tag device 200 further includes a second RF interface that is an RFID interface 209, which includes antenna 214 and a RFID transceiver 212 to communicate according to a RFID protocol. The RFID transceiver 212 includes a modulator and a demodulator. The RFID interface 209 operates independently of the associated device interface 201. The RFID interface 209 can further include a RFID memory 210 that is coupled to a tag controller 208, which is coupled to the RFID transceiver 212. The RFID memory 210 is a volatile memory used to store a dynamic identifier when the RFID interface is operated according to a default protocol, which is stored in hardware or a non-volatile memory of the tag controller 208.

When the associated device determines that a transaction is imminent, such as by location determination, or user input, or other means, the associated device (e.g. mobile device 102 of FIG. 1) obtains a unique, dynamic identifier to be used in the transaction. The dynamic identifier is obtained, for example, from a service such as account server 122 of FIG. 1. The associated device transfers the dynamic identifier to the RFID tag device via the associated device interface 201. When received at the NFC transceiver 202, the dynamic identifier can be placed first in an interface memory 206 which can be accessed by the dynamic ID controller 205. In addition to providing the dynamic identifier, the associated device can also indicate a protocol to be used in the transaction. The dynamic ID controller 205 can do one of two things with the dynamic identifier, depending on the protocol to be used in the transaction. In some embodiments the protocol may be one that is supported by the tag controller 208, in which case the dynamic ID controller 205 can provide the dynamic identifier to the tag controller 208 by writing the dynamic identifier into the RFID memory 210, allowing the tag controller 208 to access the dynamic identifier. If the indicated protocol is not one supported by the tag controller 208, the dynamic ID controller 205 can connect to the RFID transceiver 212 via a bypass switch 211 to operate as a modem, using the RFID transceiver 212. The dynamic ID controller uses a switch control line 213 to control the bypass switch 211. Upon configuring the bypass switch 211 to connect the dynamic ID controller to the RFID transceiver, the dynamic ID controller can communicate with a RFID reader, and respond to a reader signal by transmitting the dynamic identifier that is stored in interface memory 206. In some embodiments it is contemplated that the RFID transceiver 212 may not be able to operate according to some protocols, so additional other RFID transceivers (not shown) can be included in the RFID tag device 200, and can be connected to through other switches (not shown). The dynamic ID controller 205 can receive protocol parameters from the associated device via the NFC transceiver 201, or it can access stored protocol parameters in a protocol memory 207 (as well as store new protocol parameters in protocol memory 207).

The RFID tag device 200 further includes an energy collection circuit 216 that is used to collect energy received from remote transmitters at antennas 204, 214. A first regulator 218 can be used to collect energy at the associated device interface antenna 204, and a second regulator 220 can be used to collect energy at the RFID interface antenna 214. Simple rectifiers (diodes) between antennas 204, 214 and regulators 218, 220 can be used to rectify alternating current (AC) signals to store charge in, for example, a capacitor 222 through blocking diodes 230 and 231. The capacitor 222 can be electrically coupled to the interfaces 201, 209, alternatively or at the same time, and the controller 208 and 205, to provide power to those components as necessary. The arrangement shown here allows the associated device to power the RFID tag device 200 throughout the duration of a transaction event, but also, if for some reason the associated device is not present or communicating, the RFID tag device can be powered by the read signal in a conventional manner, for some types of transactions.

Figure 3:
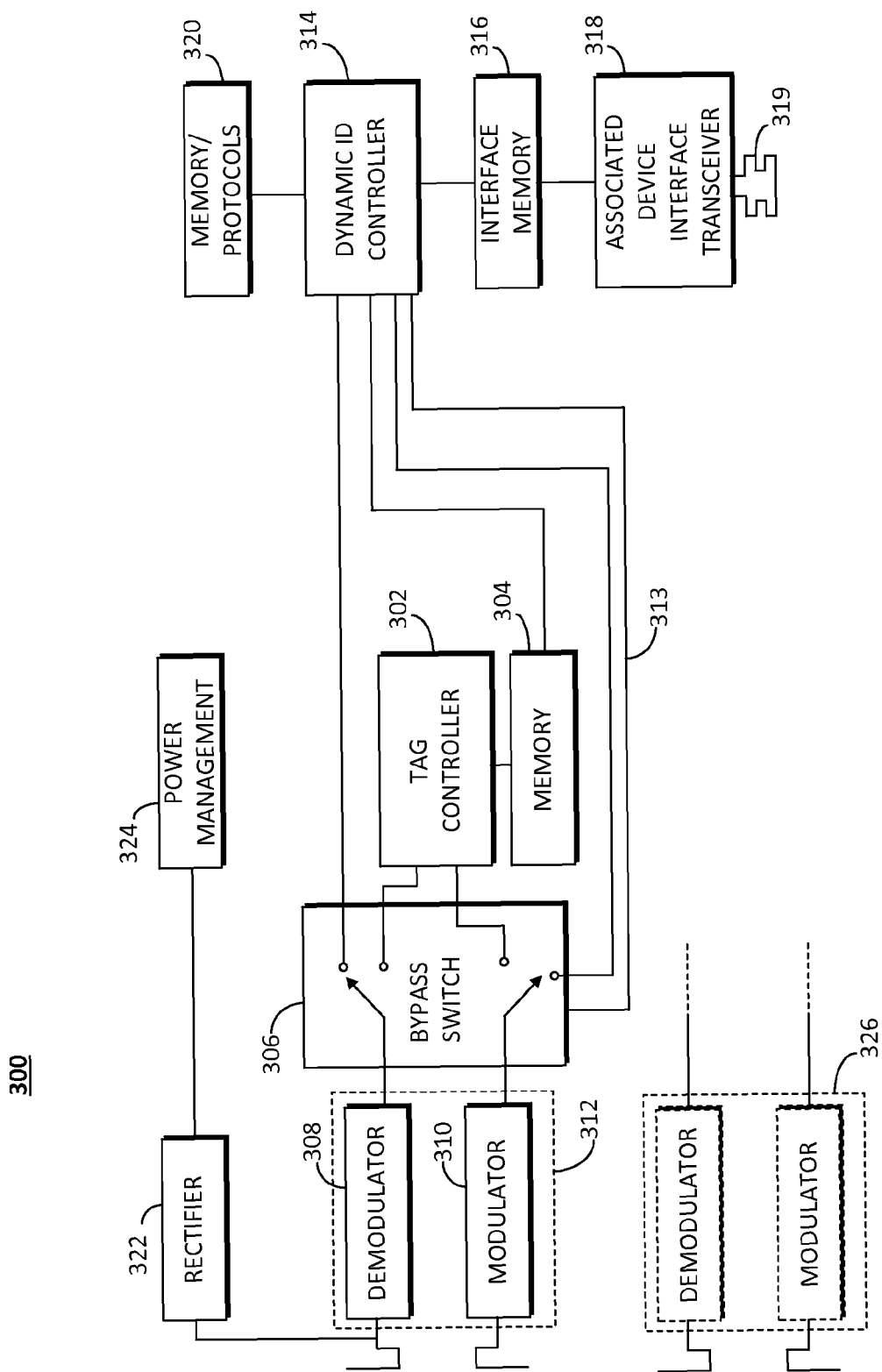
FIG. 3 is a schematic diagram of a RFID tag device in accordance with some embodiments.

FIG. 3 is a schematic diagram of a RFID tag device 300 in accordance with some embodiments. In particular the RFID tag device 300 is used as a toll tag device for wirelessly satisfying vehicular toll charges when passing through vehicular toll gateways, and having a default operating protocol that can be disabled to allow use of an alternate, non-default protocol, as required depending upon the toll gateways. Preliminarily, an associated device, such as a mobile device (e.g. mobile device 102 of FIG. 1), determines which protocol to use in an imminent transaction based, for example, on the present geographic region. The associated device can, for example, determine its own location, or it can receive a user input indicating some information that can be used to determine the protocol to be used. Different toll agencies that operate in different regions can use different protocols in their respective toll gantry or gateway systems. A protocol can be executed according to a protocol stack, which is software code that controls the timing, modulation, and other communication parameters for the RFID interface. The protocol can be embedded in the RFID tag device 300 as a default protocol (e.g. in tag controller 302), or it can be obtained from a server associated with a toll authority that operates the vehicular toll gateway, or it can be stored in a memory for dynamic use in the RFID tag device 300. The associated device also obtains a dynamic identifier to be used in the transaction. The dynamic identifier can be generated by the associated device using an appropriate application, or it can be obtained from a remote server, such as an account or transaction server associated with an account used by the RFID tag device 300, or it can be obtained from a server associated with a toll authority that operates the vehicular toll gateway.

When the protocol to be used in the anticipated imminent transaction is a default protocol, the transaction is handled by the tag controller 302 which can execute a protocol stack that is stored in the RFID memory 304 or embedded in hardware. A bypass switch block 306 couples a demodulator 308 and a modulator 310 to either the tag controller 302, or dynamic ID controller 314 under control of the dynamic ID controller via switch control line 313. The demodulator 308 and modulator 310 make up a RFID transceiver 312. In the default mode, the bypass switch 306 is configured to connect the demodulator 308 and the modulator 310 of the RFID transceiver 312 (equivalent to 212 in FIG. 2) to the tag controller 302. The dynamic identifier, having been received by the RFID tag device via the accessory interface transceiver 318 (or wired cable, in some embodiments), is placed into a memory register in the RFID memory 304 by the dynamic ID controller 314 prior to the transaction. When the read signal is received, since the demodulator 308 is connected to the tag controller 302 via the bypass switch 306, the tag controller receives the interrogation information and responds by sending the dynamic identifier to the modulator 310, which transmits the dynamic identifier to the reader.

When the protocol to be used, as dictated by the user's location, is not the default protocol, the dynamic ID controller 314 causes the bypass switch to connect the demodulator 308 and the modulator 310 of the RFID transceiver 312 of the RFID interface to the dynamic ID controller 314. The dynamic ID controller 314 then receives signals from the demodulator 308, which is operated according to the non-default protocol by the dynamic ID controller 314 which executes a protocol stack for the non-default protocol. The non-default protocol can be received or it can be retrieved by the associated device separately and transmitted to the RFID tag device 300 via the associated device interface transceiver 318 with antenna 319, or it can be stored locally, such as in a local or protocol memory 320. The dynamic identifier for the non-default protocol is stored in local memory 316. In either case, as long as a dynamic identifier was obtained, implying there has been authorization for the transaction, the RFID tag is powered by the associated device via the associated device interface until the transaction is complete. Energy can be collected, for example, by a rectifier circuit 322 and a power management circuit 324 which can collect energy from either the RFID interface or the associated device interface. Alternatively, if the RFID transceiver 312 is incapable of operating according to the required protocol, an alternate RFID transceiver 326 can be provided that can operate according to other protocols that RFID transceiver 312 cannot implement. The alternative RFID transceiver 326 can be connected to the dynamic ID controller 314 through appropriate switching arrangement (not shown), as will be appreciated by those skilled in the art. Upon completing the transaction, the associated device removes power from the RFID tag device 300. Since the dynamic identifier is stored only in the interface memory 316 or the tag memory 304, both of which are volatile memory, the dynamic identifier will be effectively erased from the RFID tag device 300 when power is removed. Thus, should the RFID tag device 300 be acquired by an unauthorized party, it cannot be used to access any account or funds since, upon being read by a reader, the RFID tag cannot provide a valid identifier.

If the associated device cannot acquire authorization for the transaction, such as if the associated device does not have proper credentials to access an account, then the associated device, executing the transaction application, will not power up the RFID tag device 300, nor provide a dynamic identifier to the RFID tag device 300. In such a case, when the RFID tag device passes through a vehicular toll gateway, the RFID can be "read" but the volatile memory register in the RFID memory 304 or in local memory 316 will be junk, and not a valid dynamic identifier, which will cause the toll authority operating the vehicular toll gateway to authenticate the transaction another way, or issue an infraction.

Figure 4:
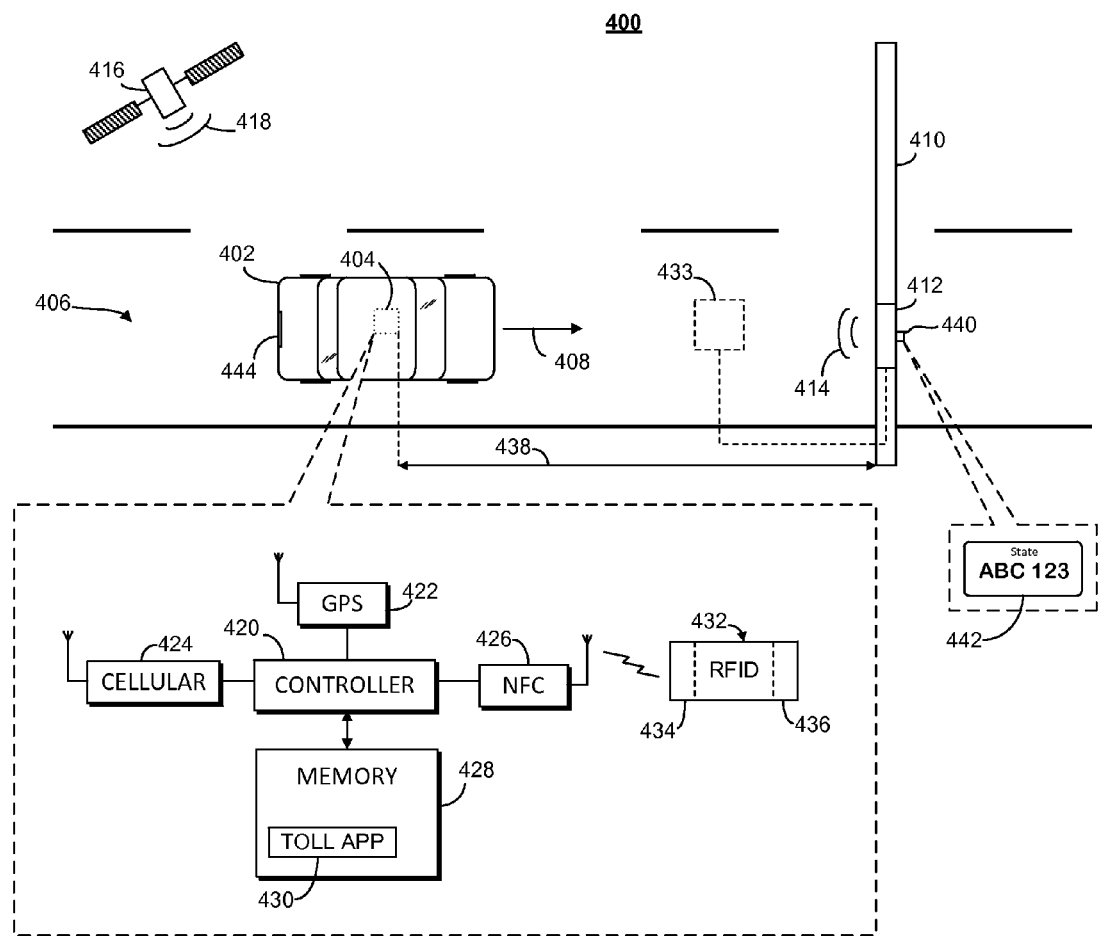
FIG. 4 is a diagram showing a tollway example of operation of a toll transaction procedure of a mobile device using an RFID tag device in accordance with some embodiments.

FIG. 4 is a diagram showing a tollway example 400 of operation of a toll transaction procedure of a mobile device 404 (similar to mobile device 102 in FIG. 1) using an RFID tag device 432 in accordance with some embodiments. A vehicle 402 travelling in a lane of traffic 406 contains a mobile device 404 that has an RFID tag device 432 designed in accordance with the present teachings attached to, or otherwise held in proximity with the mobile device 404. The vehicle 402 travels in the direction of arrow 408 towards a toll gateway 410, which detects the vehicle 402, and which contains an RFID reader 412 that emits an RFID reader signal 414.

The mobile device 404 can include several components and subsystems, such as a controller 420 that is coupled to a global positioning system (GPS) receiver 422, a cellular telephony radio transceiver 424, NFC transceiver 426, and memory 428. A toll application 430 can be stored in the memory 428, and is executed by the controller 420. The memory 428 can represent an aggregation of different types of memory, including ROM memory, RAM memory, bulk storage memory, flash memory, and so on. The GPS receiver 422 can receive GPS signals 418 transmitted by GPS satellites 416 to determine the location of the GPS receiver 422 as is known. The toll application 430 can request location information from the GPS receiver to compare the location of the GPS receiver 422 (and hence the location of the mobile device 404) with a map of toll gateway locations. As the mobile device 404 gets within a certain distance 438 of the toll gateway, the toll application 430 executed on the mobile device 404 obtains a dynamic identifier for use in the anticipated transaction with the toll gateway 410. The mobile device 404 can either transmit a request to an account or transaction server (e.g. server 122 of FIG. 1), or it can generate it locally using the toll application 430.

In some embodiments, upon determining that a transaction is imminent, the toll application 430 transmits a request to a transaction server to determine if the transaction is authorized before obtaining the dynamic identifier. Authorization can be based on credentials being received from the toll application, as well as whether there are sufficient funds available in an associated account to support the transaction, whether there is an account set up for the toll agency operating the toll gateway, and/or whether there are any issues with the account that need remedying. Once the toll application 430 determines that the transaction is authorized, and obtains the dynamic identifier to be used in the transaction, the toll application 430 can cause the mobile device 404 to turn on the NFC transceiver 426 so that it transmits to an NFC RF interface 434 on the RFID tag device 432, thereby providing power (through the energy collector circuitry) to the RFID tag device 432. The toll application 430 can then provide the dynamic identifier to be used in the transaction to the RFID tag device 432, via the NFC interface 434. If, however, the toll application 430 determines that the transaction is not authorized (i.e. no account, improper credentials, lack of funds), then it does not obtain a dynamic identifier, and payment of the toll will have to be processed in a different way (which can include a penalty for not having a toll account).

Assuming the transaction is authorized, the mobile device 404, under direction of the toll application 430, will power up the RFID tag device 432, provide the dynamic identifier, which the RFID tag device 432 stores in volatile memory, and then maintain the RFID tag device powered up for the transaction. When the vehicle 402 then passes under the toll reader 412 of the toll gateway 410, the reader signal 414 is received by an RFID interface 436 of the RFID tag device 432, and the RFID tag device responds to the reader signal by transmitting the dynamic identifier to allow a toll charge to be debited to an account associated with the dynamic identifier. In addition to the dynamic identifier, the RFID tag device 432 can also transmit other information required by the toll agency in a specified format, which can include, for example, a tag identifier that is a permanent, serialized identifier to uniquely identify the RFID tag device 432. The reader signal 414 can include information such as an identifier of the toll gateway 410, the present time, the toll amount, and so on, in some embodiments. Alternatively, or simultaneously, some of the transaction information, such as location of the toll gateway and the time of the transaction can be determined by the toll application 430 on the mobile device 404 and stored in a transaction record either locally or on the account server. Once the RFID tag device 432 has been read by the toll reader 412, an indication of the transaction, which may include transaction information, can be transmitted from the RFID tag device 432 to the mobile device, such as via the NFC RF interface 434, or other communication means. Upon receiving the indication, the toll application 430 controls the mobile device 404 to cease powering the RFID tag device 432, causing the dynamic identifier to be erased.

In some embodiments the RFID tag device 432 may not be presently operative when the vehicle passes through the toll gateway 410. Accordingly, the toll reader 412 will not receive a valid transaction identifier (the dynamic identifier) from the RFID tag device 432 as the vehicle passes through the toll gateway, which could result in no toll being paid, further resulting in penalty charge or an infraction for the driver of the vehicle 402. The toll gateway 410 can include a vehicle detection component 433 that detects vehicles as they approach and as they pass the toll gateway 410. The vehicle detection component 433 detects vehicles using any of a number of detection technologies, such as, for example, magnetic loop in-lane sensing, which uses a magnetic sensing loop embedded in the roadway 406. Other techniques of vehicle detection can be used alternatively, including microwave reflection, optical detection, or other means. The detection of an approaching vehicle can trigger the reader 412 to begin transmitting the reader signal 414. In the event that the reader 412 receives no response, or an invalid response, from a passing vehicle, a toll camera 440 can use an image 442 of the vehicle's license plate or tag 442. Typically, a license tag image like license tag image 442 is taken of every vehicle, but only used when there is no reception of a valid transaction identifier from the vehicle 402. In cases where a valid toll tag response is received (a valid dynamic identifier), the image is discarded. When no toll tag signal is received for a given vehicle, the license tag image 442 for that vehicle can be processed, such as by using optical character recognition, to determining the alphanumeric license tag number. The license tag number can be used by the toll authority to charge an account associated with the license tag number, presuming one exists, otherwise records can be used in order to issue a notice of infraction and toll citation to the registered owner of the vehicle 402.

Figure 5:
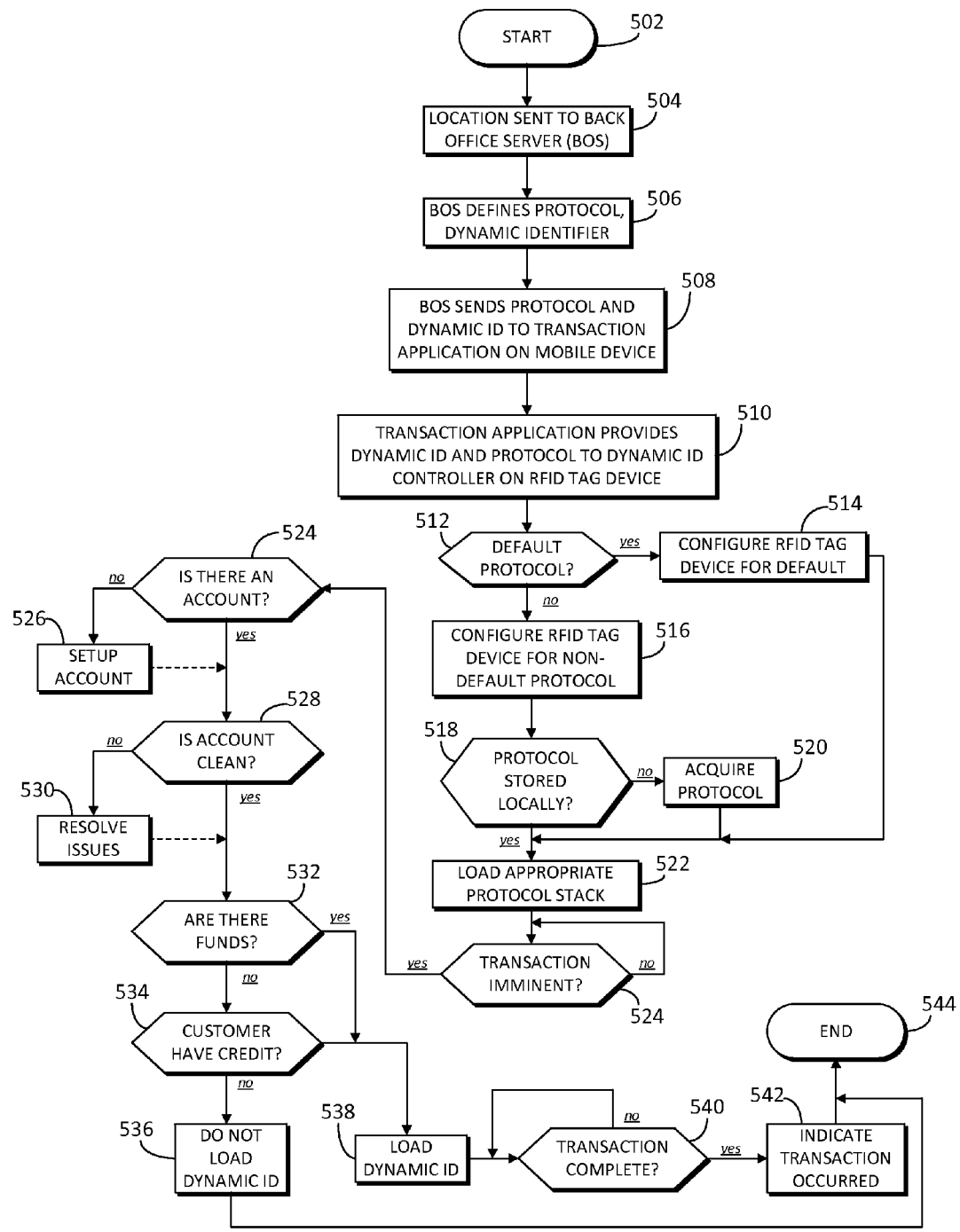
FIG. 5 is a flowchart diagram of a method of operating a RFID tag device with a dynamic identifier in accordance with some embodiments.

FIG. 5 shows a flowchart diagram of a method 500 of operating a RFID tag device with a dynamic identifier in accordance with some embodiments. Each of the various boxes shown in the flowchart diagram represent processes performed in carrying out the method. At the start 502, there is an associated device that is associated with an RFID tag device, such as mobile device 102 and RFID tag device 104 of FIG. 1. The associated device includes a transaction application that can communicate with the RFID tag device over an associated device interface of the RFID tag device. The associated device can further access networks to communicate with transaction servers, back office servers, and other entities, as needed. The associate device can interrogate the RFID device to determine, for example, whether it is using a default protocol, what protocols, what non-default protocol stacks are stored in the RFID tag device, and so on. The RFID tag device itself does not need to be associated with any account since dynamic identifiers are used, and the dynamic identifiers themselves are associated with an account or accounts. Thus, if the RFID tag device is stolen or lost, another person cannot use the RFID tag device since it is the associated device that obtains the dynamic identifiers using the credentials provided by the transaction application to authenticate the use of an account.

Once the associated device is properly powered up and operating, it can determine its location and send the location to a back office server (BOS), such as a transaction server, as indicated in process 504. The location can be determined by use of GPS information, user input, information received from wireless network infrastructure equipment, and so on. The back office server then defines or determines the protocol to be used based on the location in process 506. The back office server in some embodiments can also generate or assign a dynamic identifier, or a set of dynamic identifiers to be used in transactions. Alternatively the transaction application can generate the identifier in some embodiments. The back office server can send the protocol and dynamic identifier information to the transaction application of the associated device, as indicated by process 508. Once the transaction application has the information from the back office server, it can provide the dynamic identifier and an indication of the protocol to be used to the dynamic ID controller of the RFID tag over an associated device interface of the RFID tag device, as indicated in process 510.

Once the RFID tag device has the dynamic identifier, and an indication of the protocol to be used, it can determine if the indicated protocol is a default protocol (assuming the RFID tag device has a default protocol), as indicated in process 512. If the indicated protocol is the same as or equivalent to a default protocol, or one of a plurality of default protocols that can be implemented by a tag controller of the RFID tag device, then the RFID interface is then configured to operate according to the indicated default protocol in process 514. If the indicated protocol is not a default protocol or one otherwise capable of being performed by the tag controller, then the dynamic ID controller configures the RFID tag device to operate using the indicated, non-default protocol, such as by switching connections to the RFID interface to the dynamic ID controller, as indicated in process 516. If the indicated non-default protocol is not stored locally in the RFID tag device, such as in a memory associated with the dynamic ID controller, in process 518, then the RFID tag device must acquire the protocol as in process 520, which can be done by the associated device, and then provided to the dynamic ID controller over the associated interface. Once the appropriate protocol stack is acquired, it is then loaded, as in process 522. If the protocol is a default protocol, it is loaded by the tag controller; if the protocol is a non-default protocol, then it is loaded by the dynamic ID controller. At the termination of process 522, the RFID tag device is ready to commence a transaction.

When a transaction is imminent, such as when the associated device is within a threshold distance from, for example, a vehicular toll gateway, as determined in process 524, the method 500 can make some determinations as to the account status. For example, whether there is an account set up that can be used to fund the transaction, as in process 524. If not, the method can allow the transaction application to establish an account with an appropriate transaction server, and return to proceed with the method in process 526. The method can then determine if the account to be used for the transaction is clean, meaning that it doesn't have delinquencies, or incorrect banking information, or other correctable errors, in process 528. If there are issues that can be addressed to clean up the account for processing, then the method can do so in process 530. The method can then determine if there are funds available in the account in process 532, and if not determine whether the account holder has credit or if credit can be used in process 534. If there are no funds available and there is no credit available, the dynamic identifier is not loaded, as indicated in process 536, and the method terminates 544. However, if there is a clean account with funds or credit available, then the transaction application can command the dynamic ID controller to load the dynamic identifier for the anticipated transaction in process 538. The dynamic identifier can be loaded, for example, in the memory register of the RFID memory for a default protocol, or in a memory location associated with the dynamic ID controller for non-default protocols. For default protocols the RFID interface is connected to the tag controller, and for non-default protocols, the RFID interface is connected to the dynamic ID controller. The method then waits for a read signal, to which the RFID tag device responds with the dynamic identifier to complete the transaction, as in process 540. The dynamic identifier will be stored by the entity operating the reader (i.e. toll authority), and will be used to reconcile payment between the transaction server and the toll authority server. Once the transaction is complete, the RFID tag device can indicate such to the associated device in process 542, and the method ends; power is removed from the RFID tag device, and the dynamic identifier is thereby erased from the RFID tag device. The method can be repeated in whole, or in part for subsequent transactions. It should be noted that during the method 500, the associated device can provide power to the RFID tag device over the associated device interface.

Some embodiments include a method for operating an RFID tag device for a transaction including obtaining, by a mobile device, a dynamic identifier to be used in the transaction. The transaction can be a toll transaction or another transaction. In some embodiments obtaining the dynamic identifier can be triggered by a location of the mobile device, or it can be in response to an input received by the mobile device, including a user input or input from another device. The method further includes providing the dynamic identifier to a RFID tag device over an associated device interface of the RFID tag device, thereby powering up the RFID tag device. For example, the RFID tag device can have an energy collection circuit coupled to its associated device interface in order to receive power wirelessly, though magnetic coupling. The mobile device can power the RFID tag device using a NFC interface of the mobile device to communicate with the associated device interface of the RFID tag device. The method further includes the mobile device maintaining the RFID tag device in a powered state to allow the RFID tag device to complete the transaction, and receiving, from the RFID tag device over the associated device interface, at the mobile device, an indication that the transaction was completed. Upon receiving the indication that the transaction was completed, the mobile device removing power from the RFID tag device, thereby causing the dynamic identifier to be erased from the RFID tag device. The method can further include obtaining the dynamic identifier in response to determining, by the mobile device, a location of the mobile device and that the mobile device is approaching a transaction location. Furthermore, the method can include determining, by the mobile device, using a toll region map stored in the mobile device, a toll agency for the location of the mobile device, and determining, based on the toll agency, a protocol indicator that indicates a protocol to be used for the transaction.

Thus, the embodiments discussed and taught herein provide the benefit of allowing an appropriately equipped mobile device to use any RFID tag device designed in accordance with the teachings herein since the RFID tag device does not use a permanent tag identifier. This prevents issues with losing the RFID tag device and having unauthorized persons access the account holders funds to pay for transactions with the RFID tag device, it also provides flexibility for upgrading the user's smartphone or vehicle. The transaction application on the mobile device essentially becomes the gatekeeper by obtaining the dynamic identifier and providing it to the RFID tag device for each transaction, and synchronizing transaction information with a transaction server for settlement.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency identification (RFID) tag device that provides a dynamic identifier upon being read by an RFID reader, comprising:
   a RFID interface including a radio transceiver that transmits, according to a selected protocol, a dynamic identifier in response to receiving a read signal;
   a dynamic identification (ID) controller coupled to the RFID interface that selects the protocol based on a protocol indication and provides the dynamic identifier to the RFID interface, wherein the identifier is only stored in a volatile memory of the RFID tag device; and
   an associated device interface coupled to the dynamic ID controller over which the dynamic ID controller receives the identifier and the protocol indication from an associated device, and power to power the RFID tag device, wherein the associated device provides power to the RFID tag device to perform a transaction and removes power in response to the RFID tag device completing the transaction thereby erasing the dynamic identifier from the volatile memory.

2. The RFID tag device of claim 1, wherein the associated device interface is a wired interface.

3. The RFID tag device of claim 1, wherein the associated device interface is a wireless radio interface.

4. The RFID tag device of claim 3, wherein the wireless radio interface is a near field communication interface.

5. The RFID tag device of claim 1, wherein the dynamic ID controller is coupled to the RFID interface through a switch circuit, the RFID tag device further comprising:

tag controller coupled to the RFID interface through the switch circuit that operates according to a default protocol;

a tag memory coupled to the tag controller in which is stored a tag identifier;

wherein the switch circuit is controlled by the dynamic ID controller to couple the tag controller to the RFID interface when the protocol indication indicates the default protocol, and connects the dynamic ID controller to the RFID interface when the protocol indication indicates a non-default protocol, wherein when the protocol indication indicates the default protocol the dynamic ID controller provides the dynamic identifier to the RFID interface indirectly by writing the dynamic identifier into a volatile memory coupled to the tag controller.

6. The RFID tag device of claim 1, further comprising an energy collection circuit that collect energy from the read signal received RFID interface to power the RFID interface in responding to the read signal.

7. The RFID tag device of claim 6, wherein the associated device interface is a wireless radio interface, the energy collection circuit also collects energy from the associated device interface to communicate with the associated device over the associated device interface.

8. The RFID tag device of claim 1, wherein the identifier is a toll transaction identifier for a vehicular tollway.

* * * * *